US009528822B2

(12) United States Patent
Stieff

(10) Patent No.: US 9,528,822 B2
(45) Date of Patent: Dec. 27, 2016

(54) CALIBRATION FIXTURE FOR MACHINE VISION VEHICLE WHEEL ALIGNMENT SYSTEM

(71) Applicant: Hunter Engineering Company, St. Louis, MO (US)

(72) Inventor: Michael T. Stieff, Wentzville, MO (US)

(73) Assignee: Hunter Engineering Company, St. Louis, MO (US)

( * ) Notice: Subject to any disclaimer, the term of this patent is extended or adjusted under 35 U.S.C. 154(b) by 421 days.

(21) Appl. No.: 14/170,175

(22) Filed: Jan. 31, 2014

(65) Prior Publication Data
US 2014/0223989 A1 Aug. 14, 2014

Related U.S. Application Data

(60) Provisional application No. 61/762,716, filed on Feb. 8, 2013.

(51) Int. Cl.
*G01C 25/00* (2006.01)
*G01B 11/275* (2006.01)

(52) U.S. Cl.
CPC ....... *G01B 11/2755* (2013.01); *G01B 2210/12* (2013.01)

(58) Field of Classification Search
None
See application file for complete search history.

(56) References Cited

U.S. PATENT DOCUMENTS

| 5,724,128 | A | 3/1998 | January |
| 5,870,315 | A | 2/1999 | January |
| 6,427,346 | B1 | 8/2002 | Stieff et al. |
| 7,089,776 | B2 | 8/2006 | Dale, Jr. |
| 7,453,559 | B2 | 11/2008 | Dorrance et al. |
| 7,729,849 | B2 * | 6/2010 | Zanotti et al. ................ 701/114 |

OTHER PUBLICATIONS

Snap-On Equipment, Service-Bulletin No. SB 920 WA, "New Single Bar Calibration", Jan. 17, 2013 (8 English Pages).
Hunter Engineering Company, Form No. 6248-T, "Installation / Characterization / Calibration Instructions TD Targets", Mar. 2011 (22 Pages).
Hunter Engineering Company, Form No. 5689-T, "Calibration Instructions Hawkeye Series Sensors", Nov. 2007 (21 Pages).

* cited by examiner

Primary Examiner — Robert R Raevis
(74) Attorney, Agent, or Firm — Polster, Lieder, Woodruff & Lucchesi, LC

(57) ABSTRACT

A calibration fixture for use during a calibration procedure of a machine vision vehicle wheel alignment system. The calibration fixture consists of a pair of support legs, and a rotating transverse bar supported within an outer support tube secured between the support legs. The rotating transverse bar is supported within the outer support tube by a pair of annular bearings adjacent each end of the outer support tube, and is isolated from external influences which may result in deflection or distortion. A hub for receiving a sensor or optical target is secured to each end of the rotating transverse bar, such that optical targets mounted to each hub are maintained in axial alignment at opposite ends of the rotating transverse bar.

17 Claims, 3 Drawing Sheets

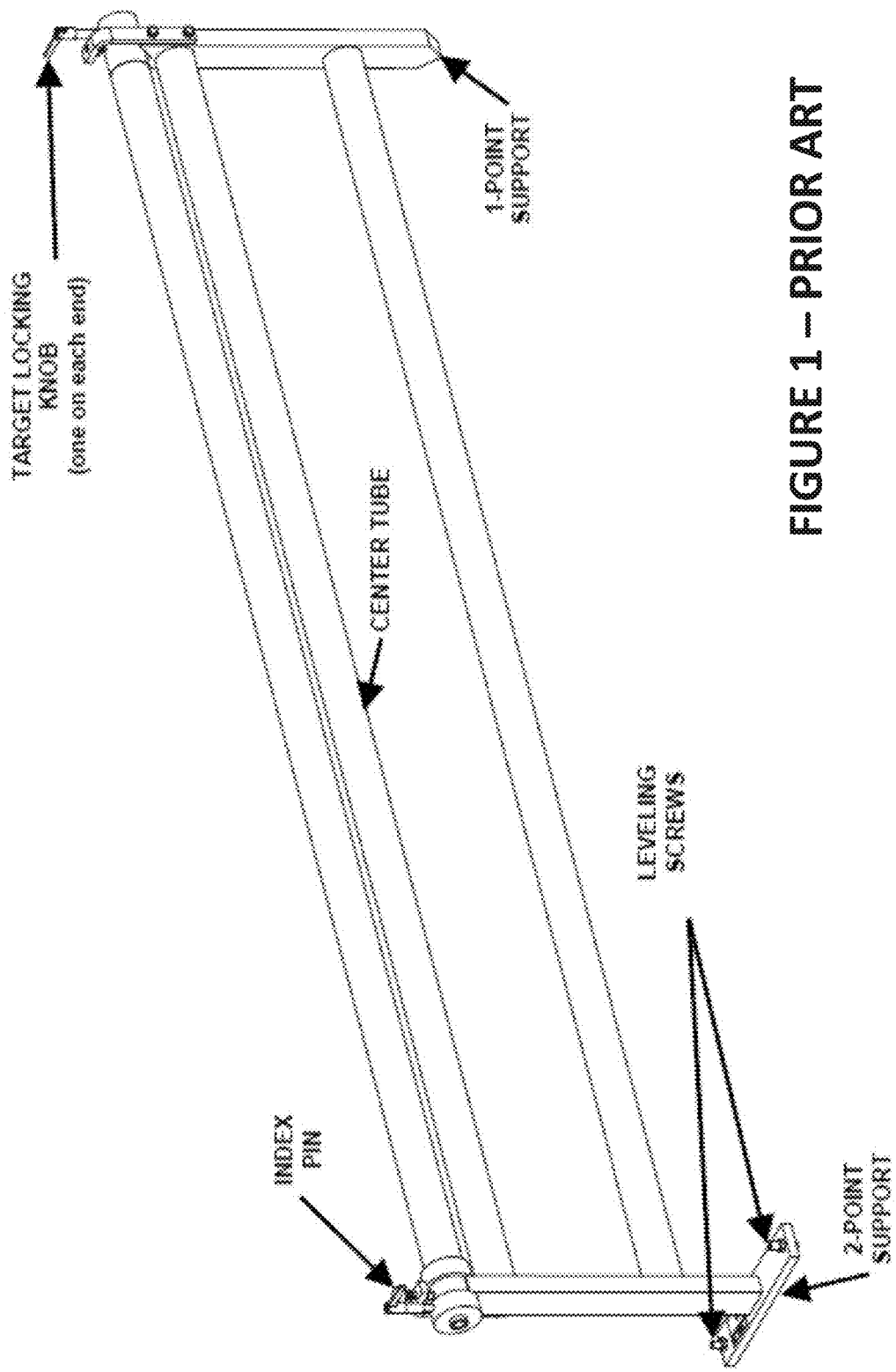

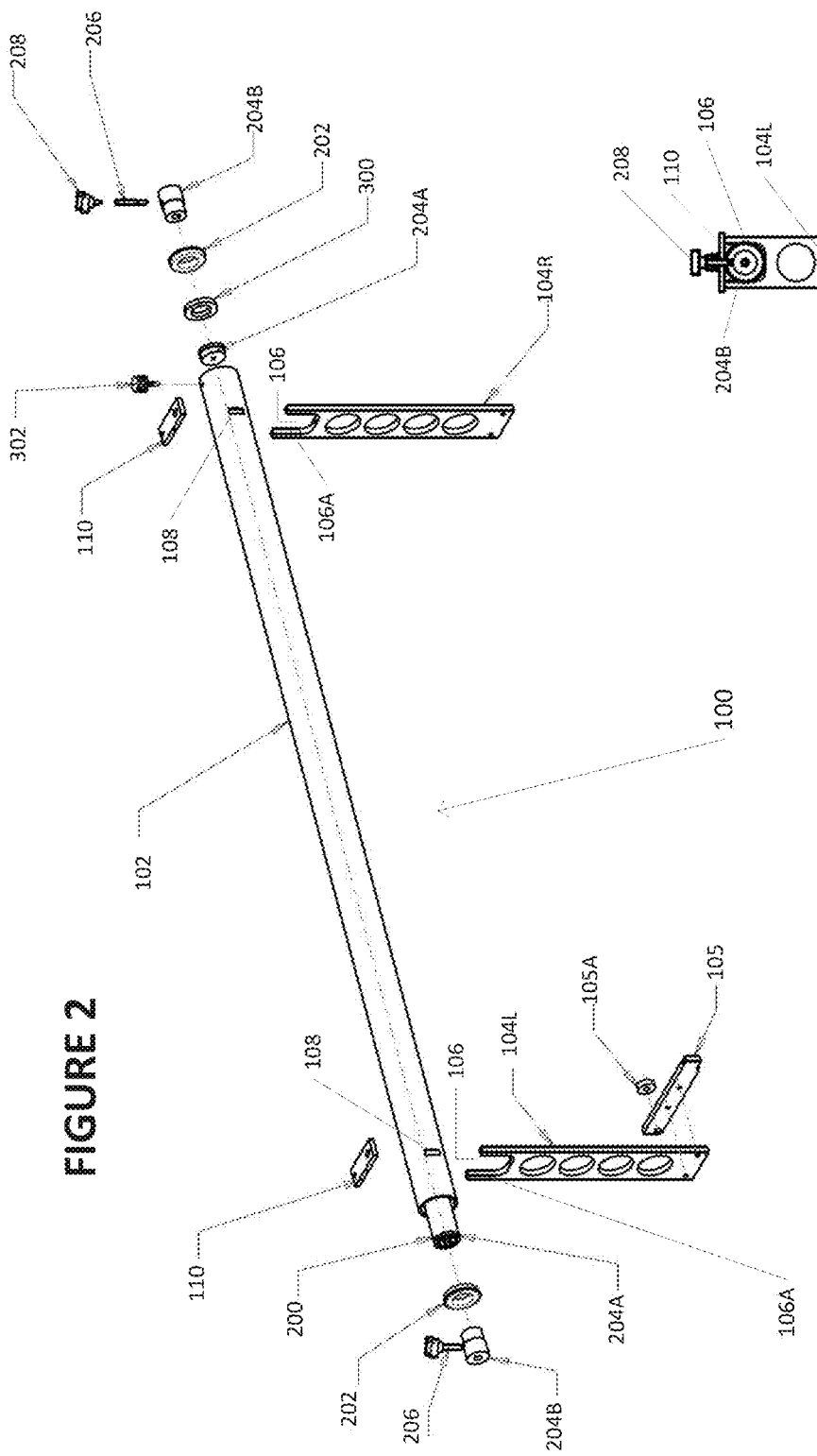

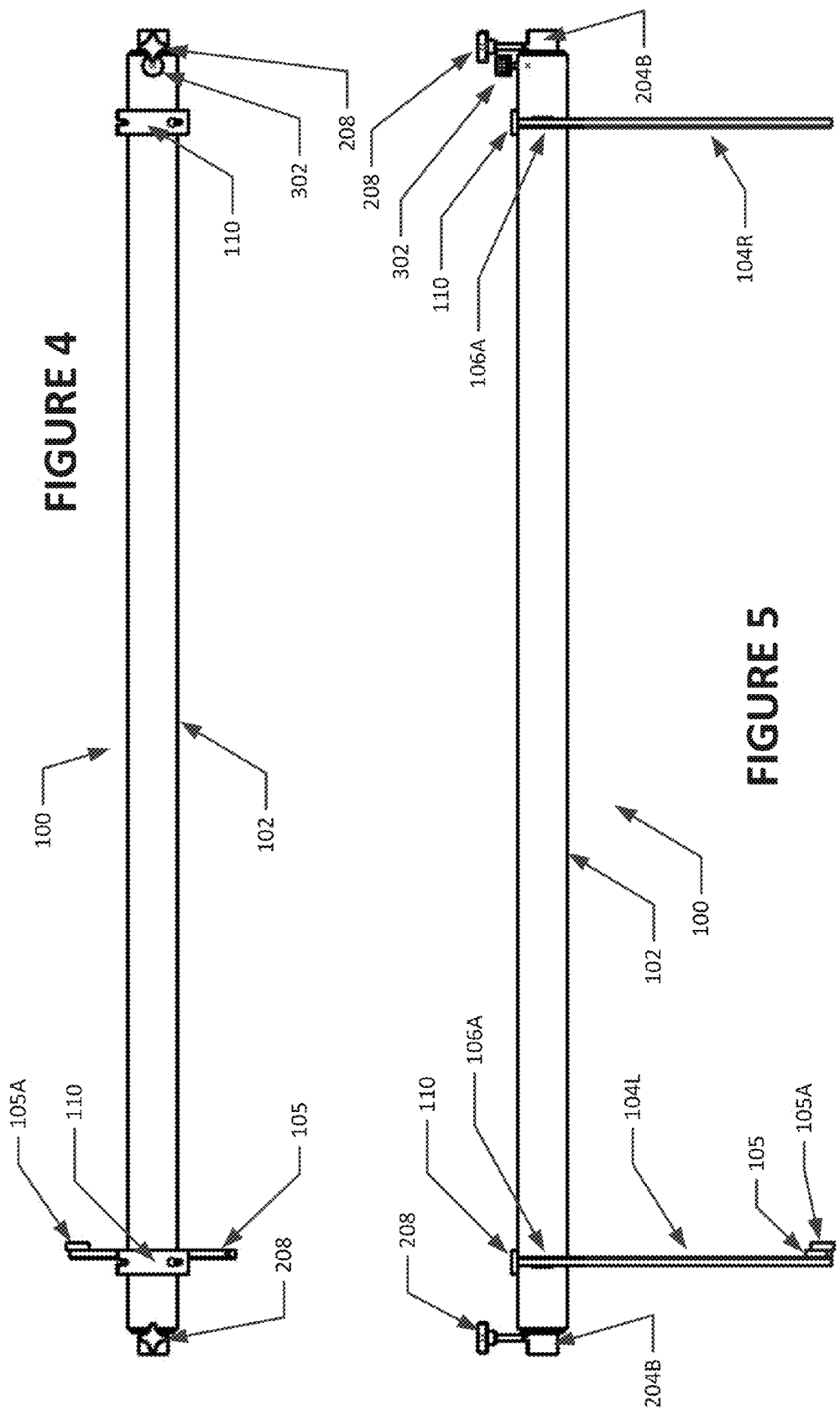

CALIBRATION FIXTURE FOR MACHINE VISION VEHICLE WHEEL ALIGNMENT SYSTEM

CROSS-REFERENCE TO RELATED APPLICATIONS

The present application is related to, and claims priority from, U.S. Provisional Patent Application Ser. No. 61/762,716 filed on Feb. 8, 2013, and which is herein incorporated by reference.

STATEMENT REGARDING FEDERALLY SPONSORED RESEARCH

Not Applicable.

BACKGROUND OF THE INVENTION

The present disclosure is related to a calibration fixture for use in calibrating a machine vision vehicle wheel alignment measurement system, and more particularly, to a light weight calibration fixture configured to receive optical targets in precision co-axial mountings at opposite ends of a rotating transverse bar, supported concentrically by bearings within an outer structural tube for isolation from external forces.

Machine vision vehicle wheel alignment measurement systems, and particularly those which utilize two or more imaging sensors or cameras, require periodic calibration to establish the relationship between the observed fields of view of each imaging sensor or camera, as well as the spatial relationships between various components such as the vehicle supporting runway and the observing imaging sensors or cameras. Conventional calibration procedures utilize a calibration fixture for supporting a pair of optical targets within the observed fields of view of the various imaging sensors or cameras undergoing calibration. The conventional calibration fixture is configured to support each optical target at an opposite longitudinal end of a rotating transverse bar, which in turn is disposed at a fixed and known elevation above the surface on which the calibration fixture is disposed. By affixing the optical targets at opposite ends of the rotating transverse bar, the resulting physical connection between the optical targets ensures that the optical targets can be rotated in unison about the longitudinal axis of the bar. Rotating each optical target through a common arc ensures that imaging sensors or cameras which observe one optical target will observe the same rotational movement as imaging sensors or cameras which observe the second optical target. By acquiring multiple images of the optical targets at various rotational positions, and at various locations within the observed fields of view, mathematical transforms can be calculated which calibrate the various imaging sensors or cameras, and which define the observed spatial environment in a common reference coordinate system.

Conventional calibration fixtures are generally of a heavy and rigid construction, in order to maintain a high degree of precision. As can be seen in FIG. 1, they typically consist of a pair of vertical support legs which are laterally spaced apart. One or more fixed cross-members extend between the vertical support legs, and maintain them in a fixed relationship. The rotating transverse bar is supported by, and extends between, the vertical support members. Mounting adapters for receiving the optical targets (or other types of sensors) are disposed at opposite ends of the rotating transverse bar, axially outward from the vertical support legs. An adjustable locking pin may be used to secure the transverse bar against rotation, and similar target locking knobs may be used to secure the individual optical targets within their mounting adapters. Other, more complex and cumbersome designs, such as shown in U.S. Pat. No. 7,089,776 B2 to Dale, Jr. incorporate multiple rotating transverse bars, as well as longitudinal and diagonal coupling members to establish an entire calibration framework for placement on a vehicle support structure.

During use, the calibration fixture, with the optical targets mounted there on, is positioned at various locations within the operative fields of view of the imaging sensors or cameras, such as spanning the space between a pair of adjacent vehicle support runways. Positioning of the calibration fixture requires the operator to physically lift or move the calibration fixture. If the calibration fixture is improperly lifted, such as by grabbing the rotating transverse bar, the rotating transverse bar can be distorted or damaged, and results of the calibration process can be affected. Similarly, if an operator contacts or rests against the rotating transverse bar during a calibration procedure, the resulting calibration values may not be accurate due to minute deflections or distortions in the rotating transverse bar.

Accordingly, it would be advantageous to provide a calibration fixture for use during calibration procedures of a machine vision vehicle wheel alignment measurement system, which is of a light weight construction, but which is capable of maintaining a supported pair of optical targets in accurate axial alignment. It would be further advantageous to provide a calibration fixture in which the rotating transverse bar is protected against external influences which may result in deflection or distortion of the longitudinal axis about which the bar rotates during a calibration procedure.

BRIEF SUMMARY OF THE INVENTION

Briefly stated, the present disclosure provides a calibration fixture for use during a calibration procedure of a machine vision vehicle wheel alignment measurement system. The calibration fixture consists of a pair of support legs, and a rotating transverse bar supported within an outer support tube secured between the support legs. The rotating transverse bar is supported within the outer support tube by a pair of annular bearings adjacent each end of the outer support tube, and is isolated from external influences which may result in deflection or distortion. A hub for receiving a sensor or an optical target is secured to each end of the rotating transverse bar, such that sensors or optical targets mounted to each hub are maintained in axial alignment at opposite ends of the rotating transverse bar.

In a further embodiment of the present disclosure, the calibration fixture is configured for easy disassembly by enabling removal of the outer support tube from the support legs without disturbing the supported rotating transverse bar enclosed within the outer support tube.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a perspective view of a prior art calibration fixture;

FIG. 2 is an exploded perspective view of a calibration fixture of the present disclosure;

FIG. 3 is an axial end view of the calibration fixture of FIG. 2;

FIG. 4 is a top plan view of the calibration fixture of FIG. 2; and

FIG. 5 is a side plan view of the calibration fixture of FIG. 2.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the figures, and to FIGS. 2-5 in particular, a calibration fixture of the present disclosure is shown generally at 100. The calibration fixture includes a transverse outer support tube 102 which is secured horizontally in an elevated position to a pair of support legs 104L and 104R, which in turn are configured for vertically upright placement on an underlying support surface. To minimize weight, each support leg is generally of an upright planar configuration, aligned parallel to an axial end face of the transverse outer support tube. The overall dimensions of the support legs are selected to minimize weight while providing a stable elevating support for the transverse outer support tube 102 at a selected height above the underlying support surface. Further weight reduction may be achieved by perforating each support leg at a plurality of points, provided that structural integrity is not compromised. One or more of the legs may be provided with an elongated stabilizing member 105 for placement against the underlying support surface to impart stability. One or more rigid rollers 105A and/or adjustable leveling feet, such as set screws, may be included at the base of at least one of the legs, facilitating movement and repositioning of the calibration fixture 100 on the underlying support surface.

Each of the support legs includes an open receiving recess 106 at a vertically-upper end opposite from the underlying support surface on which each leg is disposed. The receiving recess is sized to receive the transverse outer support tube 102 and preferably to engage a pair of retaining slots 108 on the outer circumference of the transverse outer support tube 102 with the inner sidewall surfaces 106A of the receiving recess 106. The engagement between the retaining slots 108 and the inner sidewall surfaces 106A holds the support legs 104L and 104R in a perpendicular orientation relative to the longitudinal axis of the outer support tube 102. To further secure the transverse outer support tube to the legs, a set of clamp plates 110 are bolted to the upper ends of the legs, over the open end of the receiving recesses 106, once the transverse outer support tube 102 is fully seated therein, ensuring a snug fit and minimizing movement of the support legs relative to the transverse outer support tube.

Those of ordinary skill in the art will recognize that the attachment between the transverse outer support tube 102 and the support legs 104L and 104R is not limited to the specific configuration disclosed herein, and that any a variety of other stable configurations may be utilized without departing from the scope of the present disclosure. Various attachment configurations between the transverse outer support tube and the support legs which maintain the stable connection, support the transverse outer support tube 102 in a rigid position, and which can be easily disassembled for storage and transport are acceptable. Similarly, it will be recognized that the specific configuration of the support legs 104L and 104R themselves may be varied from that which is shown and described herein, provided that they meet the minimum requirements of providing a stable support for the transverse outer support tube 102 at the selected elevation above the underlying support surface.

As best seen in FIG. 2, a rotating transverse bar 200 is supported concentrically within the transverse outer support tube 102. The rotating transverse bar 200 is a unitary member an axial length substantially coexistent with the axial length of the outer support tube 102. In alternate embodiments, the rotating transverse bar 200 may be a composite structure, and may have non-uniform dimensions along the axial length, provided that bar 200 is of sufficient structural integrity to resist twisting and deflection during rotation about the longitudinal axis to maintain opposite axial ends in rotational alignment. For example, all or a portion of the rotating transverse bar 200 may be formed by a hollow tubular structure, or alternatively, a pair of hub support structures may be coupled together for common rotation by a reduced-diameter solid structural member extending axially there between within the support tube 102.

To support the rotating transverse bar 200 within the outer support tube 102, at least a pair of annular bearings 202 having inner and outer races are disposed within the transverse outer support tube 102, preferably adjacent to each axial end. The rotating transverse bar 200 passes axially through, and is supported by, a central bore in the inner race of each annular bearing, while the outer race is fitted within the inner diameter of the transverse outer support tube 102. Rolling elements disposed between the inner and outer races of the annular bearings 202 permit the inner race, together with the supported rotating transverse bar 200, to rotate coaxially relative to both the outer race and the transverse outer support tube 102. Since support and structural stability is provided by the transverse outer support tube 102, which further functions to protect the rotating transverse bar 200 from external forces or impacts, the primary function of the rotating transverse bar 200 is to provide a precision connection between opposite axial ends, ensuring that each axial end rotates in precision synchronization about a common axis with negligible twisting along the axis.

Those of ordinary skill in the art will recognize that a variety of annular bearings or other suitable support structures may be utilized to support the rotating transverse bar 200 within the transverse outer support tube 102 and to enable relative axial rotation there between without departing from the scope of the present disclosure. For example, the inner race element of the annular bearings 202 could be eliminated by forming an inner raceway directly onto the outer circumferential surface of the rotating transverse bar 200. Alternatively, the annular bearings with rolling elements may be replaced by a suitably lubricated sleeve-type bearing or other sliding type connections in a variety of combinations.

Those of ordinary skill in the art will further recognize that while the rotating transverse bar 200 is described above and shown in FIG. 2 as being supported concentrically within the transverse outer support tube 102, in an alternate configuration the rotating transverse bar 200 may be supported for rotation within the transverse outer support tube 102 in a non-concentric relationship by suitably configured support elements. When supported in a non-concentric relationship, the longitudinal axis of rotation of the rotating transverse bar 200 is parallel to, but not coaxial with, the longitudinal axis of the transverse outer support tube 102.

Each axial end of the rotating transverse bar 200 is configured with a sensor hub 204 for receiving and supporting a sensor or optical target. Each sensor hub 204 is precisely fitted to the rotating transverse bar 200, such that supported sensors, supported optical targets, or adapters for receiving sensors or optical targets, are maintained in precise axial alignment with each other and the axis of rotation for the rotating transverse bar 200.

Sensor hubs 204 may have a variety of configurations, depending upon the particular type of adapter, sensor, or optical target to be secured and supported. For example, as shown in FIG. 2, each sensor hub 204 consists of two main components. A hub end 204A is precisely machined and fitted to each axial end of the rotating transverse bar 200, coaxial with the bar axis of rotation. Each hub end 204 is configured to receive a hub body 204B in a coaxial arrangement. The hub bodies 204B each include an axial bore for receiving an adapter, sensor, or optical target stub shaft in coaxial alignment, such that the adapters, sensors, or optical targets are maintained in coaxial alignment with the axis of rotation for the rotating transverse bar 200 and with each other. A suitable threaded locking stem 206 is threaded into a radial bore of each hub body 204B, intersecting the axial bore into which the sensor or optical target stub shafts are disposed. Threading the locking stems 206 via a knob 208, radially inward engages each stem with the associated stub shafts, providing a clamping and locking force to secure the adapters, sensors, or optical targets temporarily in place within the hub ends 204.

It will be recognized that the specific configuration of the sensor hubs 204 may be varied in alternate embodiments, depending upon the specific configuration or mounting requirements of the adapters, sensors, or optical targets which are to be utilized in conjunction with the calibration fixture 100, so long as the coaxial relationship between sensor hubs 204 on opposite axial ends of the rotating transverse bar 200 are maintained. For example, unitary components may replace the hub ends 204A and hub bodies 204B. Stub shafts may replace the axial bores in the hub bodies 204B. Mounting plates or fixtures may be utilized in place of the axial bores or stub shafts.

During use, it may be necessary to lock the rotating transverse bar 200 in place within the outer support tube 102, preventing relative rotation there between. For example, when the mounted adapters, sensors, or optical targets are disposed at a selected rotational orientation. A suitable locking mechanism may be provided within the outer support tube 102, such as an annular clamp 300 fitted about the circumference of the rotating transverse bar 200. The annular clamp 300 may be actuated via a tightening/release knob 302 passing through a radial bore in the outer support tube 102 to engage the annular clamp 300. Other suitable locking or clamping means may be employed as are well known in the art to secure one rotating component relative to another, provided that the locking or clamping means does not impart statistically significant deflection, movement, or distortion to the rotating transverse bar 200 and the associated axis of rotation linking the opposed sensor hubs 204.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A calibration fixture for use during a calibration procedure of a machine vision vehicle wheel alignment measurement system, comprising:
   a pair of support legs;
   a transverse outer support tube secured to, and supported by, said support legs;
   a rotatable transverse bar supported within said outer support tube, said rotatable transverse bar having an axis of rotation;
   a sensor hub secured at each opposite axial end of said rotatable transverse bar, external to said outer support tube; and
   at least one clamping element configured to selectively secure said rotatable transverse bar against axial rotation relative to said outer support tube.

2. The calibration fixture of claim 1 wherein each of said support legs is oriented vertically upward from an underlying support surface upon which it is disposed.

3. The calibration fixture of claim 1 wherein said rotatable transverse bar is supported within said outer support tube by at least a pair of annular bearings; and
   wherein at least one annular bearing is disposed adjacent each axial end of the outer support tube.

4. The calibration fixture of claim 1 wherein said sensor hubs are maintained in axial alignment with each other at opposite ends of the rotatable transverse bar.

5. The calibration fixture of claim 1 wherein each sensor hub includes a threaded stem engaging a threaded bore, said threaded bore extending radially from an exterior peripheral surface of said sensor hub to intersect an axial bore within said sensor hub.

6. The calibration fixture of claim 1 wherein said at least one clamping element is further configured to apply a clamping force to said rotatable transverse bar which does not impart statistically significant deflection, movement, or distortion to the rotatable transverse bar and to the associated axis of rotation linking the opposed sensor hubs.

7. The calibration fixture of claim 1 wherein at least one of said pair of support legs is supported on a roller.

8. The calibration fixture of claim 1 wherein said transverse outer support tube is removable from said pair of support legs.

9. The calibration fixture of claim 1 wherein each of said support legs includes an open receiving recess at one end, said transverse outer support tube secured within said receiving recess by engagement between receiving slots on an outer circumference of said transverse outer support tube and an inner sidewall surface of said receiving recess.

10. The calibration fixture of claim 1 wherein said rotatable transverse bar is supported concentrically within said outer support tube and an axis of rotation of said rotatable transverse bar is coaxial with a longitudinal axis of said transverse outer support tube.

11. The calibration fixture of claim 1 wherein an axis of rotation of said rotatable transverse bar is parallel to a longitudinal axis of said transverse outer support tube.

12. The calibration fixture of claim 1 wherein said sensor hubs are secured in axial alignment at opposite axial ends of said rotatable transverse bar.

13. A calibration fixture for use during a calibration procedure of a machine vision vehicle wheel alignment measurement system, comprising:
an outer support tube having a longitudinal axis;
a rotatable member supported within, and extending longitudinally through, said outer support tube, said rotatable member having a longitudinal axis of rotation;
a sensor hub secured at each opposite axial end of said rotatable member, external to said outer support tube, said sensor hubs each coaxial with said longitudinal axis of rotation; and
at least one clamping element configured to selectively secure said rotatable member against axial rotation relative to said outer support tube.

14. The calibration fixture of claim 13 further including a support structure removably coupled to said outer support tube, said support structure configured to position said outer support tube with said longitudinal axis in a stable horizontal orientation elevated above an underlying support surface.

15. The calibration fixture of claim 13 wherein said rotatable member has a longitudinal structure selected from a set of longitudinal structures including, a unitary member, a composite structure, a hollow tubular structure, or a solid elongate structure.

16. The calibration fixture of claim 13 wherein said rotatable member has structural characteristics selected to resist twisting and deflection during rotation about the longitudinal axis of rotation in order to maintain said opposite axial ends in rotational alignment to within a selected tolerance.

17. A method for synchronously rotating a pair of sensor hubs about a common axis of rotation during a calibration procedure of a machine vision vehicle wheel alignment measurement system, comprising:
providing a rotatable transverse member having a longitudinal axis of rotation;
securing a hub to each axial end of said rotatable transverse member in axial alignment with said longitudinal axis of rotation and each other;
supporting said rotatable transverse member for rotation about said longitudinal axis of rotation within an outer support tube;
altering a rotational position of said rotatable transverse member about said longitudinal axis of rotation while said outer support tube is maintained in a stationary configuration;
locking said rotatable transverse member against rotational movement relative to said outer support tube; and
wherein said step of altering said rotational position synchronously alters a rotational position of each of said secured sensor hubs about said longitudinal axis of rotation.

* * * * *